United States Patent [19]

Sato et al.

[11] Patent Number: 4,779,969
[45] Date of Patent: Oct. 25, 1988

[54] FINDING DEVICE OF VARIABLE MAGNIFICATION

[75] Inventors: Yasuhisa Sato; Shinya Yomogizawa, both of Kanagawa, Japan

[73] Assignee: Canon Kabushiki Kaisha

[21] Appl. No.: 881,818

[22] Filed: Jul. 3, 1986

[30] Foreign Application Priority Data

Jul. 3, 1985 [JP] Japan ............... 60-146172

[51] Int. Cl.⁴ .............. G02B 23/00; G02B 15/15
[52] U.S. Cl. ...................... 350/560; 350/426; 350/570
[58] Field of Search ............ 350/560, 570, 569, 519, 350/556, 555, 554, 552, 426, 425, 423

[56] References Cited

U.S. PATENT DOCUMENTS

| | | | |
|---|---|---|---|
| 696,788 | 4/1902 | Allen | 350/423 |
| 3,227,042 | 1/1966 | Smejkal et al. | 350/423 |
| 3,994,572 | 11/1976 | Uesugi et al. | 350/423 |
| 4,009,928 | 3/1977 | Back | 350/423 |
| 4,018,510 | 4/1977 | Bertele | 350/423 |

FOREIGN PATENT DOCUMENTS

| | | | |
|---|---|---|---|
| 85460 | 7/1965 | France | 350/423 |
| 1067428 | 5/1967 | United Kingdom | 350/423 |

OTHER PUBLICATIONS

Leonard Bergstein et al., "Two-Component Optically Compensated Varifocal Systems", *J. Opt. Soc. Am.*, vol. 52, No. 4, pp. 353-362, Apr. 1962.

*Primary Examiner*—Jon W. Henry
*Attorney, Agent, or Firm*—Toren, McGeady & Associates

[57] ABSTRACT

A variable magnification finder including from front to rear, a first lens unit of negative power, a second lens unit of positive power and a third lens unit of positive power, these three units constituting an objective lens of positive overall power, followed by an eyepiece lens of positive power, wherein a finder image formed by the first and second units near the third lens unit is observed by the eyepiece lens, and, with the other lens units being held stationary, the second lens unit is axially moved to vary the finder magnification.

3 Claims, 10 Drawing Sheets

FINDING DEVICE OF VARIABLE MAGNIFICATION

BACKGRUND OF THE INVENTION

1. Field of the Invention

This invention relates to variable magnification finders, and more particularly, to variable magnification finders having good optical performance at both ends of a range of variation of the magnification with a simple structure of construction suitable for use as the finders of photographic cameras and video cameras.

2. Description of the Related Art

In the type of camera in which the phototaking lens system is not linked to the finder system, when the photo-taking lens system is of variable magnification, it is desirable, from the framing standpoint, that the magnification of the finder image varies with variation of the image magnification of the photo-taking lens system. It is also desirable, from the standpoint of building the finder system into the camera housing, that its size is small, and a design type which allows a prescribed range to be obtained with ease is employed.

Japanese Laid-Open patent application No. SHO 53-63014 proposes a reverse-Galilean finder comprising, from front to rear, an objective lens of negative power and an eyepiece lens of positive power, wherein the objective lens is divided into two lens units of positive and negative powers, whereby the lens unit of negative power is moved toward the eyepiece lens in order to vary the magnification. However, reverse-Galilean finders generally have such a structure that the objective lens forms a virtual finder image to be observed, giving drawbacks that the field of view of the finder changes depending on the position of the eye, and the outline of the viewfield of the finder becomes unclear. Unlike this, the Kepler type of finder, because of its structure enabling the real finder image to be observed as the objective lens is of positive power, permits a field mask to be used at the real image position, and has the merits that the outline of the field of view is clear, and that the viewfield does not change regardless of the change of the eye position. However, the Kepler type finders are liable to increase in size because the real image is formed as the finder image, and also tend to become complicated in structure when good optical performance is preserved. This tendency has been prominent in the variable magnification Kepler type finders.

SUMMARY OF THE INVENTION

It is, therefore, an object of the present invention to provide a Kepler type finder of variable magnification which enables a prescribed ratio of variation of the magnification to be easily obtained by merely moving one lens unit, while nevertheless preserving good optical performance before and after the variation of the magnification, with a simple structure of construction.

DETAILED DESCRIPTION OF THE PREFERRED EMBODIMENTS

Figure 1A:
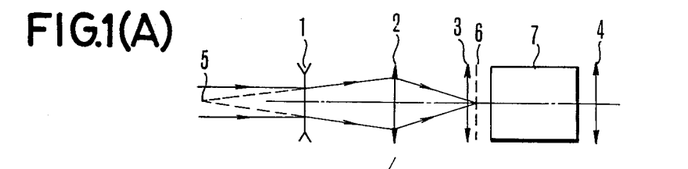
FIGS. 1(A) and 1(B) are diagrams of an embodiment of the invention expressed as a thin lens system.

The finders of the invention depicted in FIG. 1(A) and those that follow, each comprise, from front to rear, a first lens unit of negative refractive power, a second lens unit of positive refractive power, a third field lens unit of positive refractive power, the first to third units constituting an objective lens of positive overall refractive power, and an eyepiece lens of positive refractive power, the first and second lens units forming a finder image near the third lens unit, the finder image being observed by the eyepiece lens, and the second lens unit being made axially movable to vary the finder magnification.

Figure 1B:
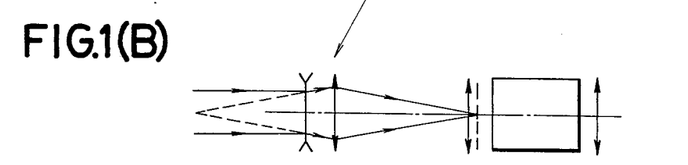

The present invention will next be described in greater detail. FIGS. 1(A) and 1(B) depict the optical system of an embodiment of the finder of variable magnification according to the present invention, in the thin lens concept. FIG. 1(A) shows the optical arrangement before the magnification varies, that is, in the wide angle end, and FIG. 1(B), that after the variation of the magnification, that is, in the telephoto end. In these figures, 1, 2 and 3 denote the above-identified first, second and third lens units of negative, positive and positive powers, respectively, constituting the objective lens whose overall power is positive. 4 is the eyepiece lens of positive power. 7 is a Porro prism for making a vertically, horizontally inverted image as is known in the art, shown in the form of an expanded block for the purpose of convenience. 5 is a finder image as the virtual image of an object by the first lens unit 1. 6 is another finder image as the real image formed by the second lens unit 2 near the third lens unit 3. The finder image 6 is observed through the Porro prism 7 and the eyepiece lens 4.

In this embodiment, the finder magnification is altered by the first and second lens units 1 and 2, the third lens unit 3 merely conducts the light bundle toward the eyepiece lens 4 or plays the role of a so-called field lens, and the eyepiece lens 4 plays the role of enlarging the finder image 6 to be observed.

As for the change magnification, the image magnification of the second lens unit 2 is altered by moving the second lens unit 2 axially forward to effect change of the magnification from the wide angle to the telephoto end. That is, the image magnification of the second lens unit 2 is relatively small in the wide angle end of FIG. 1(A), but becomes relatively large in the telephoto end of FIG. 1(B).

In this embodiment, by employing such a construction, the optical performance is maintained good before and after the change of the magnification. In this embodiment, further, in order to obtain a better finder image as the variable magnification finder, it is preferred that the various elements are set forth as follows:

Though FIGS. 1(A) and 1(B) have been illustrated so that the finder image 6 has almost the same position between the optical arrangements of the wide angle end and the telephoto end, it is to be understood that with mere provision for moving the second lens unit 2 alone, it is difficult to make coincident both image positions and such a finder system gives a problem of changing the diopter. In order to avoid this so that the diopter is maintained constant before and after alternation of the finder magnification, letting the focal lengths of the first and second lens units be denoted by $f_1$ and $f_2$, respectively, the separations between the first and second lens units in the wide angle and telephoto ends by $e_W$ and $e_T$, resectively, and the movement of the second lens unit with variation of he magnification, for example, the ratio of chnge of the magnification, by z, a certain relationship has to be given for these parameters.

Now assuming that the image magnifications of the second lens unit in the wide angle and telephoto ends take values of $-1/\sqrt{z}$ and $-\sqrt{z}$, respectively, the positions at which the finder image 6 is sharpest can be brought into exact coincidence with each other. At this time, $$f_2/(f_1+f_2-e_W) = -1/\sqrt{z} \quad (1)$$

$$f_2/(f_1+f_2-e_T) = -\sqrt{z} \quad (2)$$

are established. Here, if the separation $e_T$ is taken at $e_T \div 0$ in order to minimize the physical length of the finder system, from (2), one has $$f_1/f_2 = -(1/\sqrt{z}+1) \quad (3)$$

In this embodiment, in order that, while the optical performance before and after the alternation of the magnification is maintained good, the size of the entire system of the finder is minimized so as to be suitable for photographic cameras or video cameras, it is favorable that the ratio of change of the magnification lies in a range of about $z=1.2$ to 5. Then, the equation (3) becomes:

$$1.1 \leq |f_1/f_2| \leq 2 \quad (4)$$

When the refractive power of the second lens unit becomes too small compared with the first lens unit beyond the lower limit of the inequalities of condition (4), the required amount of movement of the second lens unit for the change of the magnification becomes large, causing the total lens length to increase. Conversely, when the refractive power of the second lens unit becomes stronger beyond the upper limit of the inequalities of condition (4), it becomes difficult to maintain the optical performance good before and after the change of the magnification.

If the finder system is used only in both of the wide angle end and the telephoto end, the deviation of the diopter of the finder can be perfectly removed by the method described above. However, when an intermediate region between the wide angle and telephoto ends is also made usable, a finder diopter error will occur in that region despite the above-stated various conditions being satisfied.

Figure 2A:
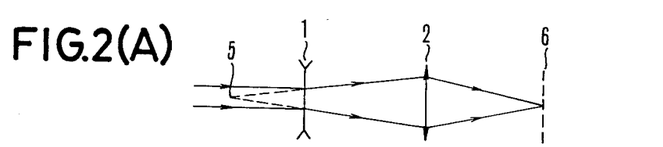
FIGS. 2(A) to 2(C) are diagrams of geometry considered to explain what positions the sharp finder image takes as the image magnification varies.
Figure 2B:
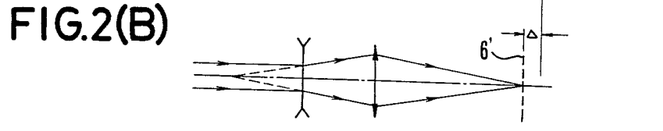
Figure 2C:
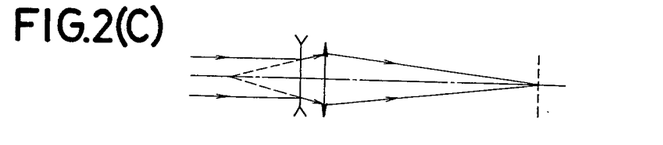
Figure 3A:
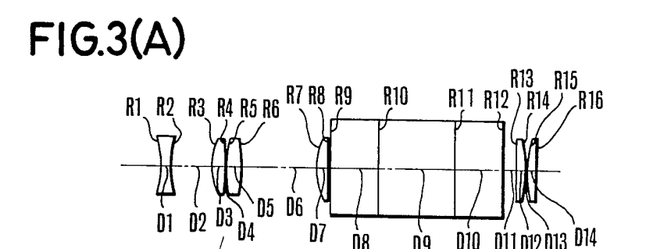
FIGS. 3(A), 3(B), and FIGS. 5, 7 and 9 are lens block diagrams of specific examples of the invention, respectively.
Figure 3B:
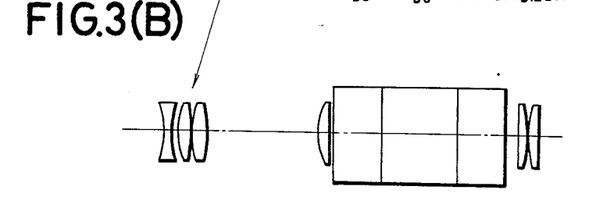
Figure 4A:
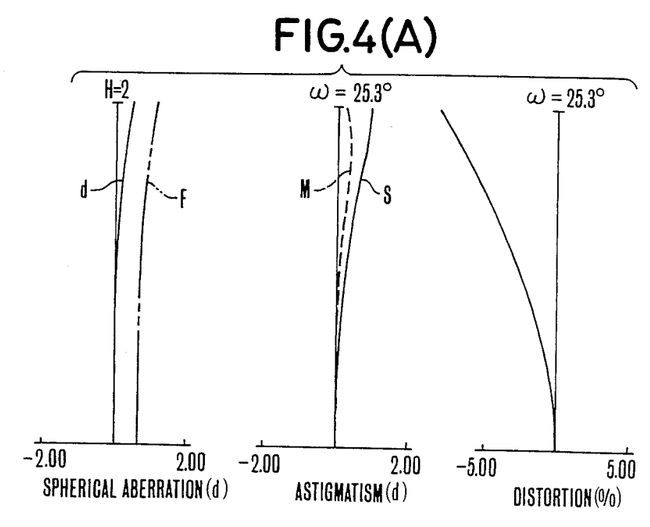
FIGS. 4(A)-4(C), 6(A)-6(C), 8(A)-8(C) and 10(A)-10(C) are graphic representations of the aberrations of the finders of FIGS. 3, 5, 7 and 9 in the wide angle, middle and telephoto positions, respectively.
Figure 4B:
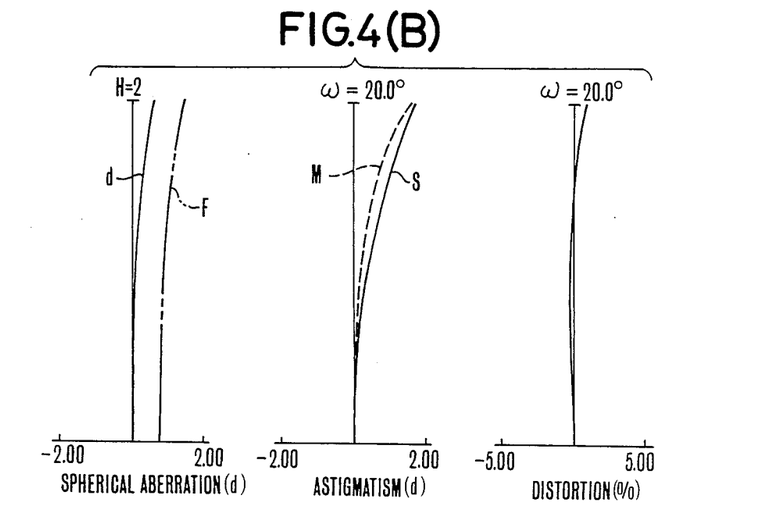
Figure 4C:
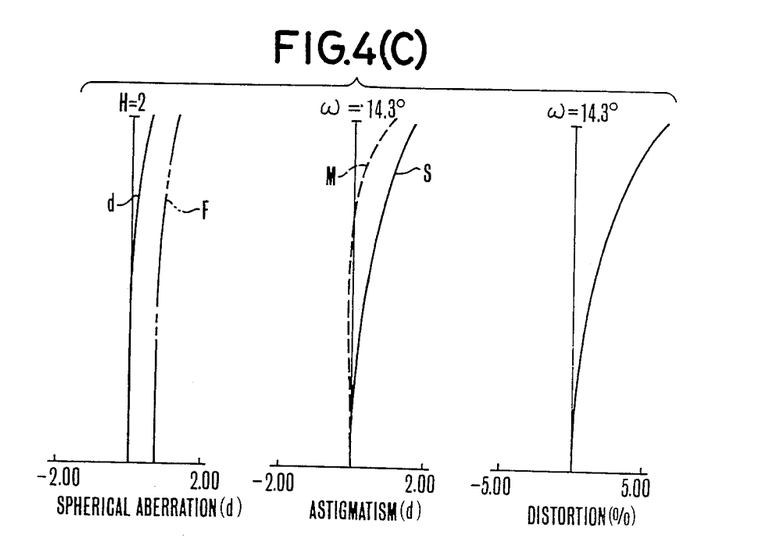
Figure 5:
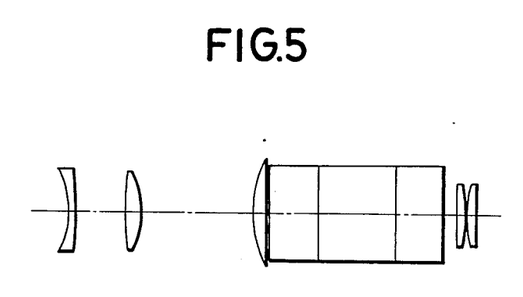
Figure 6A:
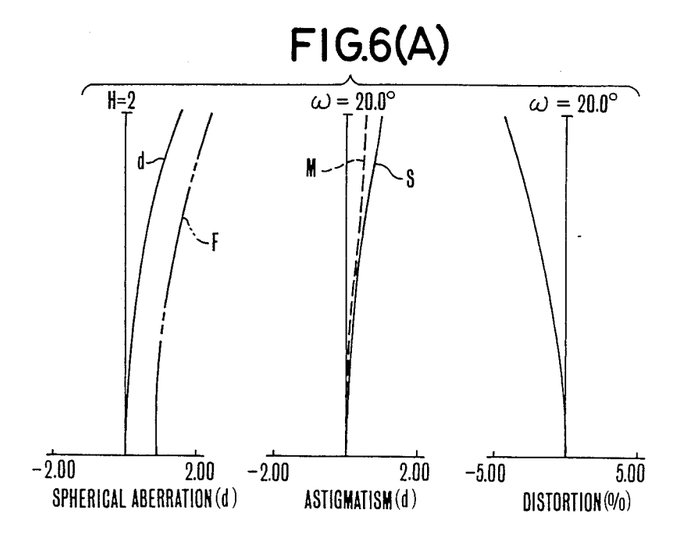
Figure 6B:
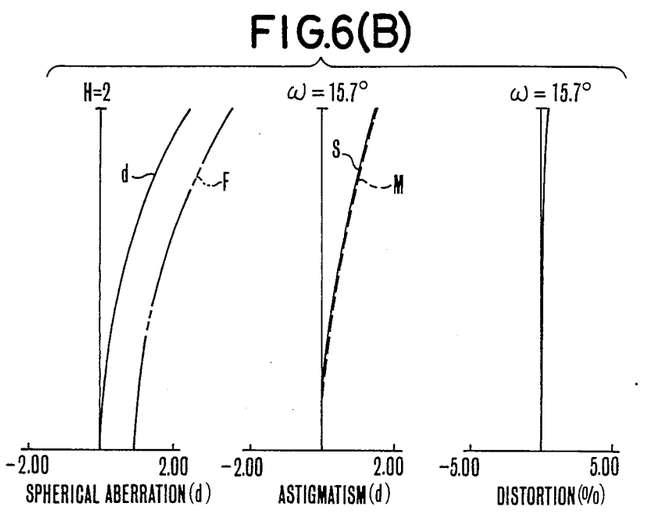
Figure 6C:
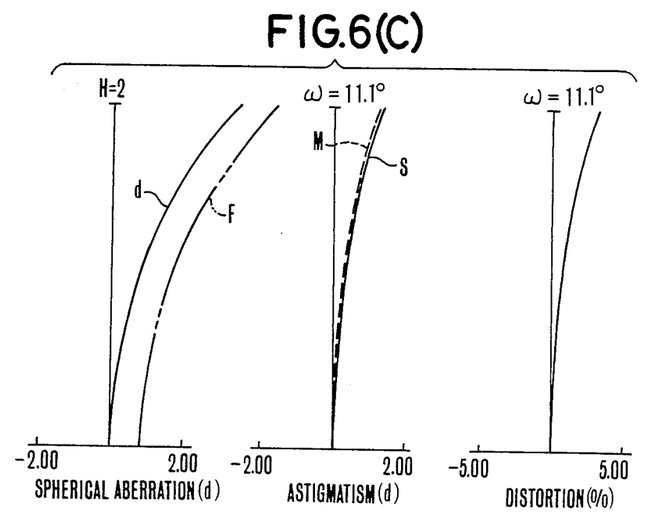
Figure 7:
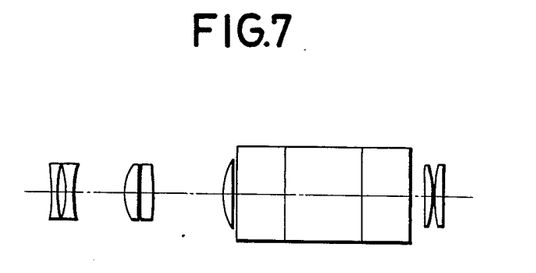
Figure 8A:
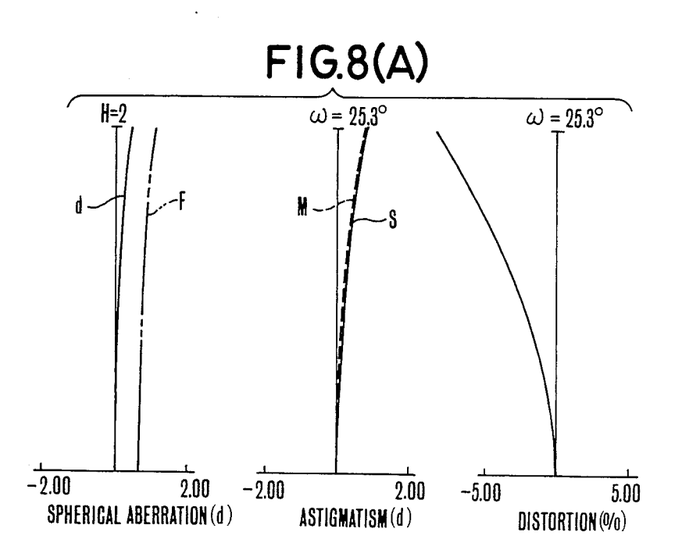
Figure 8B:
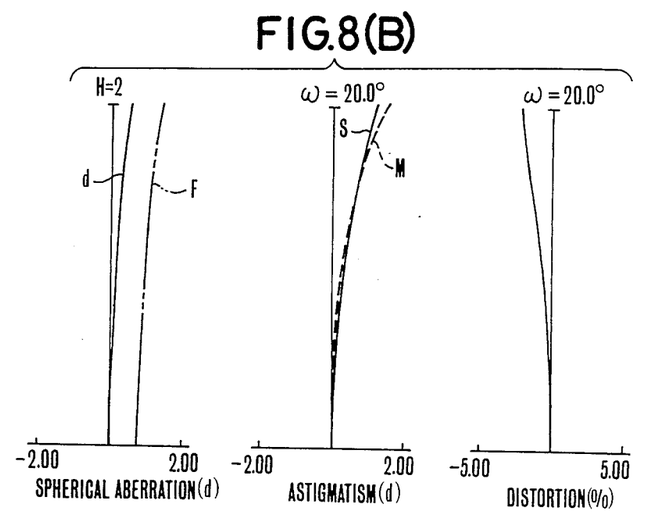
Figure 8C:
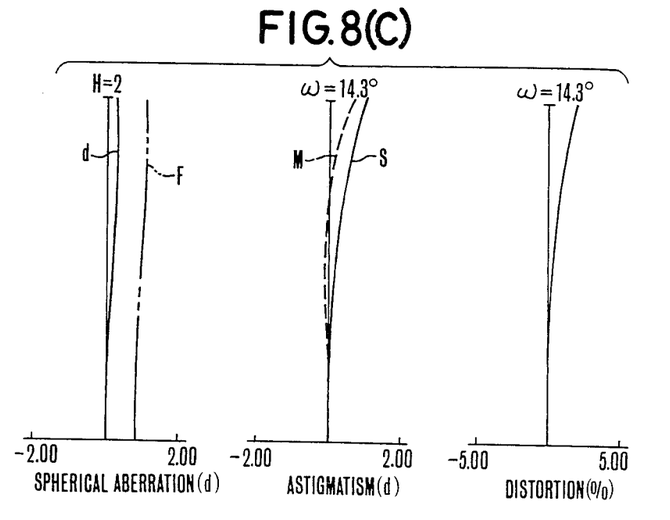
Figure 9:
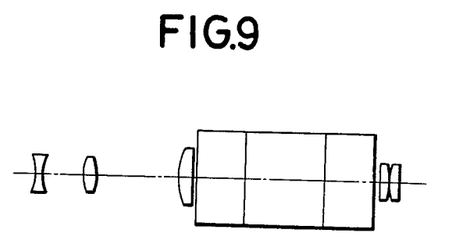
Figure 10A:
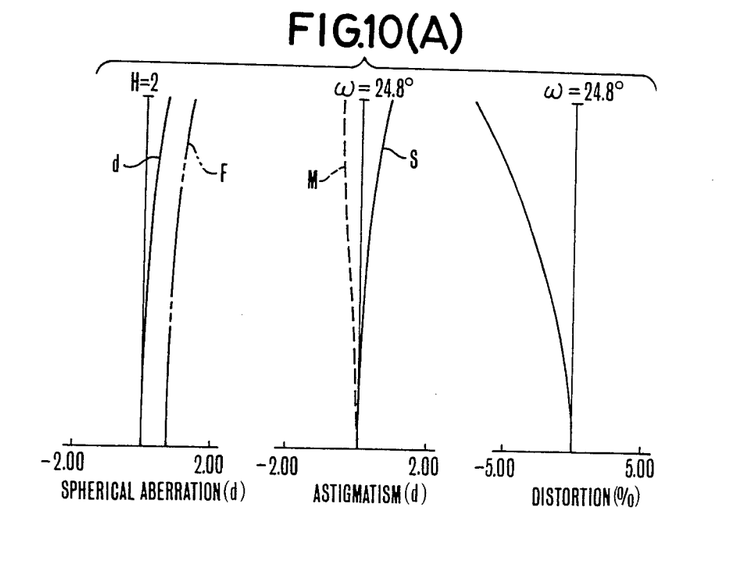
Figure 10B:
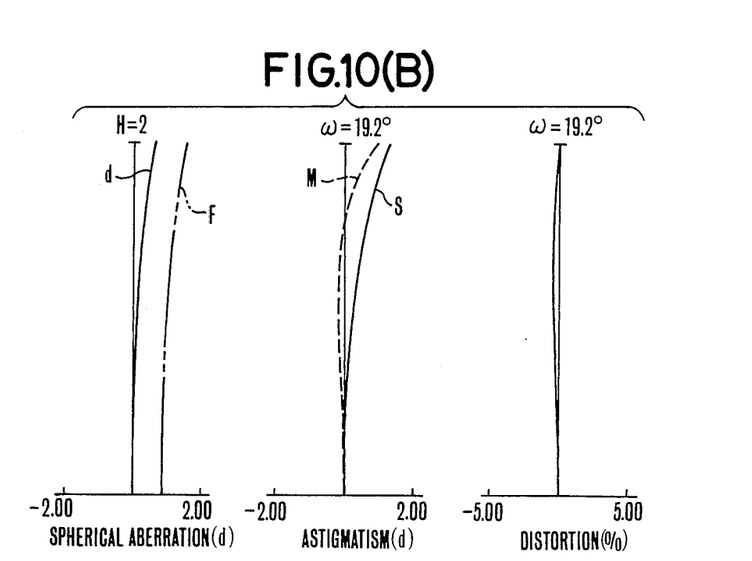
Figure 10C:
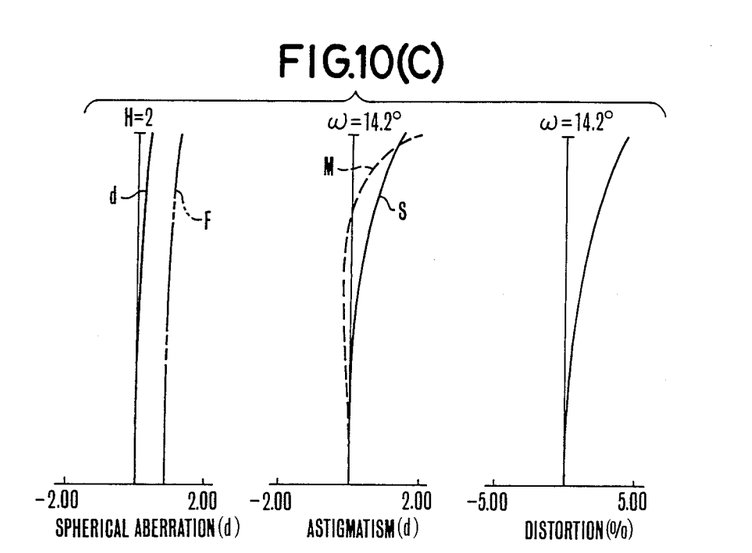

FIGS. 2(A) to 2(C) are schematic diagrams illustrating such a situation in the optical system of the finder. FIG. 2(A) is the wide angle end, FIG. 2(B) is the intermediate region, and FIG. 3(C) is the telephoto end. When varying the magnification, an image shift Δ, concerning the error of the finder diopter, takes place in the intermediate region of FIG. 2(B). The value of the image magnification of the second lens unit at which the finder image shifts largest distance from the prescribed position is found to be $-1$ by the optical principle on the magnification change.

In general, the maximum acceptable error of the finder diopter, though depending on the conditions, has been said to be about 2 diopters. So, if the shift from the ideal image plane for the finder image in the intermediate region of FIG. 2(B) falls within a range of 2 in diopter, no problem will arise in actual practice. Letting now the image shift of FIG. 2(B) be denoted by Δ, and the focal length of the eyepiece lens be fe, as the shift equivalent to the error of 1 diopter is expressed nearly by $fe^2/1000$, for an error of less than 2 diopters, one has $$|\Delta| \leq 2 \times (fe^2/1000) \quad (5)$$

The focal length fe of the eyepiece in the photographic camera or video camera is about 10 to 40 mm. Therefore, from (5), $$|\Delta| \leq 0.2 \text{ to } 3.2 \quad (6)$$

is obtained. Meanwhile, the shift is determined by the optical principle on the magnification change to be $$\Delta = \sqrt{z}\left(1 - \frac{1}{\sqrt{z}}\right)^2 \cdot f_2 \quad (7)$$

From (6) and (7), $$\sqrt{z}\left(1 - \frac{1}{\sqrt{z}}\right)^2 \cdot f_2 \leq 3.2 \quad (8)$$

is found. Therefore, in the embodiment of the invention, the magnification change ratio z and the focal length $f_2$ of the second lens unit are set as in the equation (8), so that despite the second lens unit only being moved when the magnification is changed, the error of the finder diopter in the intermediate region can be negligible. Thus, the sharpness of the finder image caan be maintained good throughout the entire range of continuous variation of the magnification.

It is to be noted that in order that, despite the lens construction and arrangement being simple, coma be well corrected for an improved quality of the finder image before and after the change of the magnification, it is preferred that the first lens unit include at least one negative lens whose front surface is concave toward the front, and the second lens unit include at least one positive lens whose front surface is convex toward the front.

Figure 11:
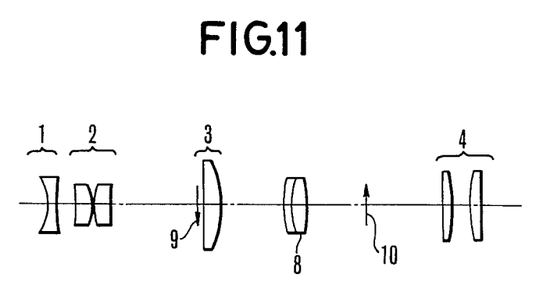
FIG. 11 is a longitudinal section view of the optics of another embodiment of the invention.

The Porro prism used as the erector of the finder image in the illustrated embodiment of the invention is not always necessary. For example, in application of an invention to the sight of the astronomical telescope, as there is no concern for the inverted image, the prism may be omitted. In another embodiment of the invention shown in FIG. 11, instead of the Porro prism, use is made of an erecting lens system 8, thereby the finder image 9 is re-focused to a finder image 10 to be observed.

In the invention, each lens may be made of synthetic resin by molding techniques with an advantage that the lens can be easily formed to a desired shape. It is also preferable to apply an aspherical surface to at least one lens surface in the first or second lens unit for the purpose of well correcting the various aberrations, such as distortion, astigmatism and halo.

Examples of specific lens systems of the invention can be constructed in accordance with the numerical data given below for the radii of curvature, R, the axial thicknesses or air separations, D, and the refractive indices, N, and the Abbe numbers, $\nu$, of the glasses of the various lens elements with subscripts numbered consecutively from front to rear.

The aspherical surface marked (*) is expressed by an expanded equation for the departure X from the osculating spherical surface having a radius of curvature R, in x-axis parallel to the optical axis in terms of the height H from the optical axis in y-axis perpendicular to the optical axis, with an original point at the intersection of the vertex of the lens surface and the x-axis and the direction in which light advances taken as positive as follows:

$$x = \frac{\left(\frac{1}{R}\right)H^2}{1 + \sqrt{1 - \left(\frac{H}{R}\right)^2}} + AH^2 + BH^4 + CH^6 + DH^8 + EH^{10}$$

where A, B, C, D and E are aspherical coefficients.

Example 1
$2\omega = 50.6° - 28.6°$

| | | | | | | |
|---|---|---|---|---|---|---|
| R 1 = | −9.89 | D 1 = | 1.0 | N 1 = 1.49171 | $\nu$ 1 = 57.4 |
| R 2 = | 20.86 | D 2 = | 6.95 − 3.95 − 0.85 | | |
| R 3 = | 9.01 | D 3 = | 2.5 | N 2 = 1.49171 | $\nu$ 2 = 57.4 |
| R 4 = | −67.27 | D 4 = | 0.2 | | |
| R 5 = | 34.48 | D 5 = | 2.5 | N 3 = 1.49171 | $\nu$ 3 = 57.4 |
| *R 6 = | −12.40 | D 6 = | 12.30 − 15.30 − 18.40 | | |
| R 7 = | 9.00 | D 7 = | 2.0 | N 4 = 1.49171 | $\nu$ 4 = 57.4 |
| R 8 = | −494.72 | D 8 = | 0.52 | | |
| R 9 = | ∞ | D 9 = | 8.2 | N 5 = 1.51633 | $\nu$ 5 = 64.1 |
| R10 = | ∞ | D10 = | 12.8 | N 6 = 1.64769 | $\nu$ 6 = 33.8 |
| R11 = | ∞ | D11 = | 7.8 | N 7 = 1.64769 | $\nu$ 7 = 33.8 |
| R12 = | ∞ | D12 = | 2.4 | | |
| R13 = | ∞ | D13 = | 1.5 | N 8 = 1.49171 | $\nu$ 8 = 57.4 |
| R14 = | −21.41 | D14 = | 0.15 | | |
| R15 = | 21.41 | D15 = | 1.5 | N 9 = 1.49171 | $\nu$ 9 = 57.4 |
| R16 = | ∞ | | | | |

$|f_1/f_2| = 1.41$, $f_1 = -13.5$, $f_2 = 9.56$, $z = 1.88$ $\sqrt{z}\,(1 - 1/\sqrt{z})^2 f_2 = 0.96$ Aspherical Coefficients for R6
$A = 0, B = 5.84 \times 10^{-4}, C = -5.78 \times 10^{-5}$

Example 2
$2\omega = 39.9° - 22.2°$

| | | | | | | |
|---|---|---|---|---|---|---|
| R 1 = | −13.09 | D 1 = | 1.0 | N 1 = 1.88300 | $\nu$ 1 = 40.8 |
| R 2 = | −88.88 | D 2 = | 8.36 − 4.80 − 1.30 | | |
| R 3 = | 43.71 | D 3 = | 3.0 | N 2 = 1.77250 | $\nu$ 2 = 49.6 |
| R 4 = | −11.28 | D 4 = | 18.40 − 21.96 − 25.46 | | |
| R 5 = | 17.11 | D 5 = | 2.5 | N 3 = 1.77250 | $\nu$ 3 = 49.6 |
| R 6 = | −2345.04 | D 6 = | 0.36 | | |
| R 7 = | ∞ | D 7 = | 8.2 | N 4 = 1.51633 | $\nu$ 4 = 64.1 |
| R 8 = | ∞ | D 8 = | 12.8 | N 5 = 1.64769 | $\nu$ 5 = 33.8 |
| R 9 = | ∞ | D 9 = | 7.8 | N 6 = 1.64769 | $\nu$ 6 = 33.8 |
| R10 = | ∞ | D10 = | 2.4 | | |
| R11 = | ∞ | D11 = | 1.5 | N 7 = 1.49171 | $\nu$ 7 = 57.4 |
| R12 = | −21.41 | D12 = | 0.15 | | |

-continued
Example 2
$2\omega = 39.9° - 22.2°$

| | | | | | |
|---|---|---|---|---|---|
| R13 = | 21.41 | D13 = | 1.5 | N 8 = 1.49171 | $\nu$ 8 = 57.4 |
| R14 = | ∞ | | | | |

$|f_1/f_2| = 1.47$, $f_1 = -17.5$, $f_2 = 11.892$, $z = 1.8$ $\sqrt{z}\,(1 - 1/\sqrt{z})^2 f_2 = 1.04$

Example 3
$2\omega = 50.6° - 28.6°$

| | | | | | |
|---|---|---|---|---|---|
| R 1 = | −135.98 | D 1 = | 1.0 | N 1 = 1.49171 | $\nu$ 1 = 57.4 |
| R 2 = | 19.04 | D 2 = | 1.5 | | |
| R 3 = | −14.96 | D 3 = | 1.0 | N 2 = 1.49171 | $\nu$ 2 = 57.4 |
| R 4 = | 19.82 | D 4 = | 8.58 − 5.61 − 2.61 | | |
| R 5 = | 6.55 | D 5 = | 2.5 | N 3 = 1.49171 | $\nu$ 3 = 57.4 |
| R 6 = | 70.34 | D 6 = | 2.0 | | |
| R 7 = | 39.08 | D 7 = | 2.5 | N 4 = 1.49171 | $\nu$ 4 = 57.4 |
| *R 8 = | −12.34 | D 8 = | 11.28 − 14.25 − 17.25 | | |
| R 9 = | 9.00 | D 9 = | 2.0 | N 5 = 1.49171 | $\nu$ 5 = 57.4 |
| R10 = | −494.72 | D10 = | 0.52 | | |
| R11 = | ∞ | D11 = | 8.2 | N 6 = 1.51633 | $\nu$ 6 = 64.1 |
| R12 = | ∞ | D12 = | 12.8 | N 7 = 1.64769 | $\nu$ 7 = 33.8 |
| R13 = | ∞ | D13 = | 7.8 | N 8 = 1.64769 | $\nu$ 8 = 33.8 |
| R14 = | ∞ | D14 = | 2.4 | | |
| R15 = | ∞ | D15 = | 1.5 | N 9 = 1.49171 | $\nu$ 9 = 57.4 |
| R16 = | −21.41 | D16 = | 0.15 | | |
| R17 = | 21.41 | D17 = | 1.5 | N10 = 1.49171 | $\nu$10 = 57.4 |
| R18 = | ∞ | | | | |

$|f_1/f_2| = 1.2$, $f_1 = -11$, $f_2 = 9.2$, $z = 1.89$ $\sqrt{z}\,(1 - 1/\sqrt{z})^2 f_2 = 0.94$ Aspherical Coefficients for R8
$A = 0, B = 9.88 \times 10^{-4}, C = 1.58 \times 10^{-5}, D = 4.39 \times 10^{-6}, E = 0$

Example 4
$2\omega = 49.6° - 28.4°$

| | | | | | |
|---|---|---|---|---|---|
| R 1 = | −10.00 | D 1 = | 1.0 | N 1 = 1.49171 | $\nu$ 1 = 57.4 |
| R 2 = | 21.01 | D 2 = | 6.65 − 4.11 − 1.54 | | |
| R 3 = | 11.06 | D 3 = | 2.4 | N 2 = 1.49171 | $\nu$ 2 = 57.4 |
| *R 4 = | −7.40 | D 4 = | 13.27 − 15.81 − 18.38 | | |
| R 5 = | 8.83 | D 5 = | 2.4 | N 3 = 1.49171 | $\nu$ 3 = 57.4 |
| R 6 = | ∞ | D 6 = | 0.5 | | |
| R 7 = | ∞ | D 7 = | 8.0 | N 4 = 1.49171 | $\nu$ 4 = 57.4 |
| R 8 = | ∞ | D 8 = | 12.8 | N 5 = 1.51633 | $\nu$ 5 = 64.1 |
| R 9 = | ∞ | D 9 = | 8.0 | N 6 = 1.49171 | $\nu$ 6 = 57.4 |
| R10 = | ∞ | D10 = | 1.04 | | |
| R11 = | ∞ | D11 = | 1.5 | N 7 = 1.49171 | $\nu$ 7 = 57.4 |
| R12 = | −21.35 | D12 = | 0.1 | | |
| R13 = | 21.35 | D13 = | 1.5 | N 8 = 1.49171 | $\nu$ 8 = 57.4 |
| R14 = | ∞ | | | | |

$|f_1/f_2| = 1.45$, $f_1 = -13.64$, $f_2 = 9.43$, $z = 1.70$ $\sqrt{z}\,(1 - 1/\sqrt{z})^2 f_2 = 0.87$ Aspherical Coefficients for R4
$A = 0, B = 6.11 \times 10^{-4}, C = -5.55 \times 10^{-6}, D = 1.78 \times 10^{-6}, E = 0$ According to the present invention, a variable magnification finder is provided in which the objective lens of positive power is divided into three parts, of which the second part only is made to move, thereby the prescribed magnification change ratio can be easily obtained, while still maintaining the good imaging performance before and after the change of magnification. Particularly, in the wide angle and telephoto ends, there occurs no error of the finder diopter. Moreover, even when the magnification is continuously varied over the entire range, the deviation of the finder diopter can be made to fall within the allowable range. Thus, the variable magnification finder of very simple structure of construction can be realized.

What is claimed is:

1. A device comprising:
a fixed lens unit of negative refractive power;
a movable lens unit of positive refractive power arranged in rear of said fixed lens unit to move along an optical axis to vary the magnification of an image of an object;
a field lens disposed on or near a presumed image forming plane of a synthetic optical system composed of said fixed lens unit and said movable lens unit; and
an eyepiece lens unit for observing the object image formed by said fixed lens unit and said movable lens unit, whereby $$1.1 \leq |f_1/f_2| \leq 2$$

is satisfied, where $f_1$ and $f_2$ are the focal lengths of said fixed and said movable lens units, respectively.

2. A device according to claim 1, wherein said field lens is of positive refractive power and is arranged between said fixed lens unit and said eyepiece lens unit.

3. A device according to claim 1, further comprising prismatic optical means for inverting the object image vertically, horizontally between said fixed lens unit and said eyepiece lens unit.

* * * * *